Figure 1:
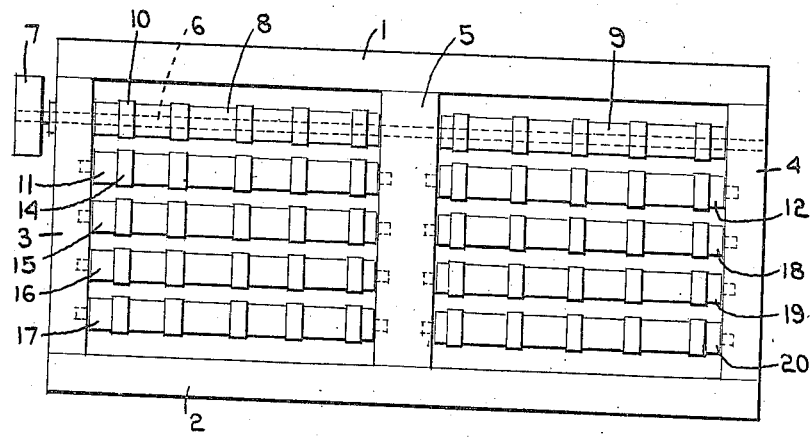

Feb. 13, 1923.

G. J. J. CLARK.
PROCESS FOR MIXING PULVERULENT MATERIALS.
FILED JAN. 27, 1919.

1,445,488.

Inventor.
George J. J. Clark
by Heard Smith & Tennant
Attys.

Patented Feb. 13, 1923.

1,445,488

UNITED STATES PATENT OFFICE.

GEORGE J. J. CLARK, OF WEST HANOVER, MASSACHUSETTS, ASSIGNOR TO THE NATIONAL FIREWORKS MANUFACTURING COMPANY, OF WEST HANOVER, MASSACHUSETTS, A CORPORATION OF ARIZONA.

PROCESS FOR MIXING PULVERULENT MATERIALS.

Application filed January 27, 1919. Serial No. 273,282.

*To all whom it may concern:*

Be it known that I, GEORGE J. J. CLARK, a citizen of the United States, residing at West Hanover, county of Plymouth, State of Massachusetts, have invented an Improvement in Processes for Mixing Pulverulent Materials, of which the following description, in connection with the accompanying drawing, is a specification, like characters on the drawing representing like parts.

This invention relates to improvements in processes and apparatus for mixing pulverulent or granular materials and the object thereof broadly is to mix a plurality of ingredients into a homogeneous mass without causing the ingredients to be pulverized.

More specifically the invention relates to improvements in processes and apparatus for mixing granular chemicals, such as are used in pyro-technical devices in which a thorough mixture of the ingredients in predetermined proportions is necessary.

In mixing the composition used in the manufacture of various pyro-technical devices, it has heretofore been, and now is the usual custom to introduce the various ingredients in the predetermined proportions into a large receptacle and to stir the ingredients by means of a paddle manipulated by hand until a homogeneous mixture is obtained. The mixture then is rammed into the desired container to form the pyro-technical device. A number of pyro-technical devices made from each batch of composition are tested in order to determine whether a proper mixture has been obtained and if it is found that the devices thus tested are defective, the entire batch is discarded. It is therefore very essential, in mixing pyro-technical substances, that a homogeneous mixture is obtained and that the ingredients of which the mixture is composed are of proper proportions to produce the desired effect.

Heretofore it has been very difficult to maintain the proper proportions in each batch and to make different batches of uniform quality since various circumstances occur during the mixing operation which are likely to cause a variation in the product. For example, in mixing batches by hand, fine powders of the lighter materials arise and drift off in the form of dust as the operator stirs the mixture and of course the amounts of such ingredients are thereby lessened, thus vitally affecting the mixture. Again, it is found that the condition of the humidity of the atmosphere affects the character of the mixture so that when the atmosphere is moist, a greater proportion of certain ingredients is required than when the atmosphere is comparatively dry.

Many of the chemicals which are used in the manufacture of pyro-technical devices are of a poisonous character and consequently injurious to the health of the operator and various means have been devised to prevent the dust rising during the mixing operation from being inhaled by the operator.

One of the principal objects of the invention is to provide a process and apparatus for mixing granular chemicals of this character which will prevent the loss of any of the ingredients which will prevent the deleterious action of the moisture of the atmosphere upon the chemicals and which will insure the operator from the effect of the poisonous materials which are being mixed.

A further object of the invention is to provide a process and apparatus for mixing ingredients of this character in which uniformity of the product will be insured so long as the chemicals are taken from the same supplies, thus avoiding the necessity of making so many tests.

Other objects and features of the invention will more fully appear from the following description and the accompanying drawings and will be pointed out in the annexed claims.

The process of mixing pulverulent or granular materials, or more specifically chemicals, of the character above described, consists in introducing the ingredients to be mixed in the predetermined proportions into a substantially cylindrical receptacle, closing said receptacle to prevent the escape of any material thus introduced and rotating the receptacle about a horizontal or substantially horizontal axis until the materials are homogeneously mixed. The receptacles preferably are of such capacity that the charge will only partially fill them so that the granules may tumble freely within the receptacles.

The receptacles are preferably of relatively small diameter and capacity so that the weight of the materials and the friction of the particles against each other will be so small as not to pulverize any of the ingredients to a finer degree, since pulverization of chemicals used in pyro-technics affects the rapidity of the combination with other ingredients during the combustion of the mixture. If the ingredients of certain mixtures are coarsely granular the combustion is much slower than if the ingredients are finely granulated. It is therefore very important that the predetermined granular condition of the ingredients forming the mixture shall be maintained.

In order to prevent deleterious action of the atmosphere upon the materials being mixed, the receptacles are desirably provided with closures which may be hermetically sealed so that the ingredients of the mixture are only subjected to the small amount of atmosphere which is present in the receptacles during their rotation. Thus the operator is enabled to introduce exactly the right proportions of the various ingredients to produce the desired result without fear that the composition will be affected by changing of differing conditions in the atmosphere during the operation of mixing one batch or of a number of batches.

In mixing compositions of the character above described, it is desirable to have the composition at all times under the observation of the operator. A further object of the invention is to provide a process and apparatus in which the ingredients shall be mixed within a closed receptacle having a transparent wall through which the mixture can always be seen. This is accomplished by the present invention by providing a receptacle having a transparent wall, such as a glass jar, provided with a suitable closure, preferably a hermetically sealing top, and rotating the receptacle by suitable means. The process therefore of mixing granular materials may be said to comprise—

First: introducing materials into a cylindrical, rotatable receptacle, closing the receptacle to prevent the escape of any of the material and rotating the same;

Second: introducing the ingredients of the material in a receptacle of the character specified having a closure which is adapted to be hermetically sealed; and Third: confining the ingredients which are to form the composition in a rotatable receptacle having transparent walls through which the materials can always be observed.

*Apparatus.*

A preferred form of apparatus for performing the process above described is illustrated in the accompanying drawings in which Fig. 1 is a plan view of a mechanism for supporting and rotating the receptacles containing the ingredients to be mixed.

Figure 2:
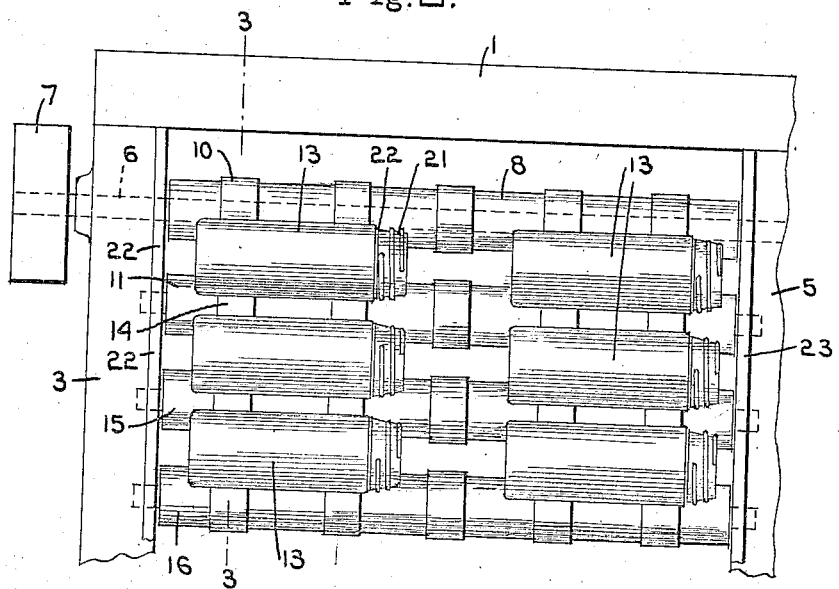
Figure 3:
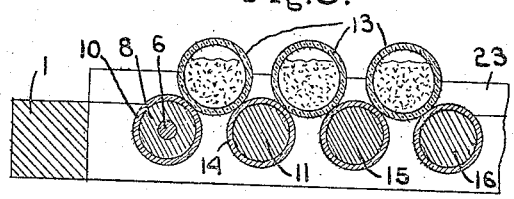

Fig. 2 is a plan view upon a larger scale of a portion of said apparatus showing the mixing cylinders in operative position; and Fig. 3 is a vertical transverse sectional view on lines 3—3 Fig. 2.

The apparatus illustrated in the drawing is adapted to rotate simultaneously a number of mixture-containing receptacles. It comprises a rectangular frame having sides 1, 2 and ends 3, 4 and desirably a cross-piece 5 connected to the sides 1, 2 intermediate of said ends and preferably at the middle of the sides. A shaft 6 having a driving pulley 7 is journaled in suitable bearings in the ends 3—4 and the cross-piece 5. The rollers 8, 9 are suitably secured to the shaft 6 intermediate of the end 3 and the cross-piece 5 and between the cross-piece 5 and end 4 respectively. These rollers desirably are provided with parallel surfaces of frictional, preferably resilient, material of greater or less extent, as may be desired. As illustrated herein bands 10 of rubber or other resilient material are suitably secured to the rollers at intervals, or the entire surface of the roller and may if desired be covered with a suitable material which will engage frictionally the wall of the receptacle to be rotated. Co-operating rollers 11, 12 are mounted respectively in suitable journals in the end 3 and cross-piece 5, and the cross-piece 5 and end 4, and lie in parallelism with the rollers 8 and 9 respectively. The pairs of rollers 8, 11 and 9, 12 are spaced apart to such a distance that the receptacles 13 will be suitably supported by said rollers and rotated by frictional contact with the driven rollers 8 and 9. The rollers 11 and 12 are provided with frictional bands or surfaces 14 of the same character as those of the rollers 8 and 9. When the receptacles 13 are rotated by the driven rollers 8 and 9, the rollers 11 and 12 are rotated by the frictional engagement of the walls of the receptacles 13 with the surfaces 14 upon said rollers. Other rollers 15—16—17—18—19—20 in any desired number may be placed in parallelism with the rollers 11 and 12 and may support other receptacles 13 so that a number of such receptacles may be rotated at the same time. Of course as many of these rollers may be positively driven as desired instead of being driven from the rollers 8 and 9 as above described.

The receptacles 13 preferably are of cylindrical form and constructed of glass or other transparent material. Any suitable closures may be provided for the receptacles, a convenient closure being in the form of a screw cap 21 such as is used on ordinary glass preserving cans. As a matter of fact, the usual preserving cans may be employed for the purposes above specified In the operation of the machine, the various ingredients which are to form the composition are weighed or measured out in predetermined proportions and placed within the receptacle 13, care being taken that the receptacle shall not be completely filled so that there will be sufficient room for the material to tumble about within the receptacle. The cap 21 is then screwed down upon the receptacle, a gasket 22 desirably being imposed between the cap and receptacle in order to hermetically seal the same.

The receptacle, or as many receptacles as desired, may then be laid upon the rollers as indicated in Fig. 2 whereupon power applied to the pulley 7 will rotate the receptacles in the manner above specified. The rotation may be continued until the mixing operation is complete and the ingredients commingled into a homogeneous mass, the condition of the mixture being observed through the transparent walls of the receptacle.

In order to prevent the receptacles traveling off the roller, bars 22—23 may be fastened across the ends of the frame or between the side pieces 1—2 at such points as will retain the receptacles in proper positions upon the rollers.

It will be understood that various modifications in the form of apparatus may be made and that any means may be employed to rotate one or more receptacles within the spirit and scope of the claims which follow.

Having thus described my invention what I claim as new and desire to secure by Letters Patent is:

1. The method of uniformly mixing the pulverulent ingredients of pyrotechnic devices, which consists in accumulating said pulverulent ingredients in predetermined proportions in a dry state in a confined substantially horizontal mass, agitating, and freely intermingling and moving said ingredients about a horizontal axis of rotation, and maintaining said confined mass of ingredients free from exterior disturbing influences while being thus agitated, intermingled and moved.

2. The method of uniformly mixing the pulverulent ingredients of pyrotechnic devices, which consists in accumulating the pulverulent ingredients in predetermined proportions in a dry state in a sealed and confined substantially horizontal mass, agitating, and freely intermingling and moving said ingredients about a horizontal axis of rotation, and inspecting said confined mass while sealed and confined.

In testimony whereof, I have signed my name to this specification.

GEORGE J. J. CLARK.